Oct. 4, 1966   C. W. ANDREWS   3,276,994
SEWAGE TREATMENT
Filed March 9, 1966   2 Sheets-Sheet 2
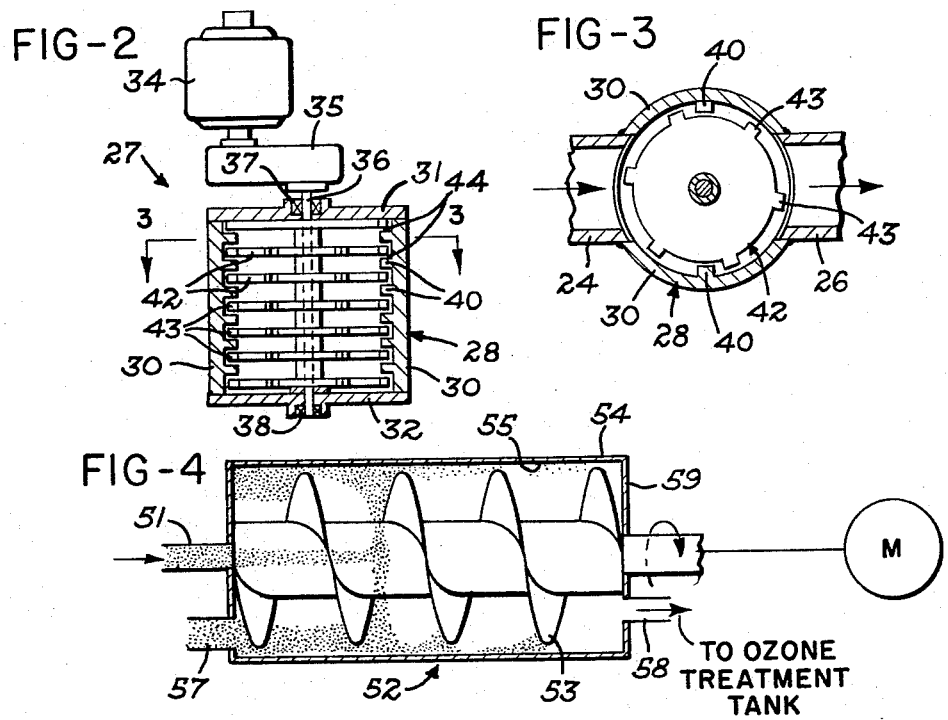
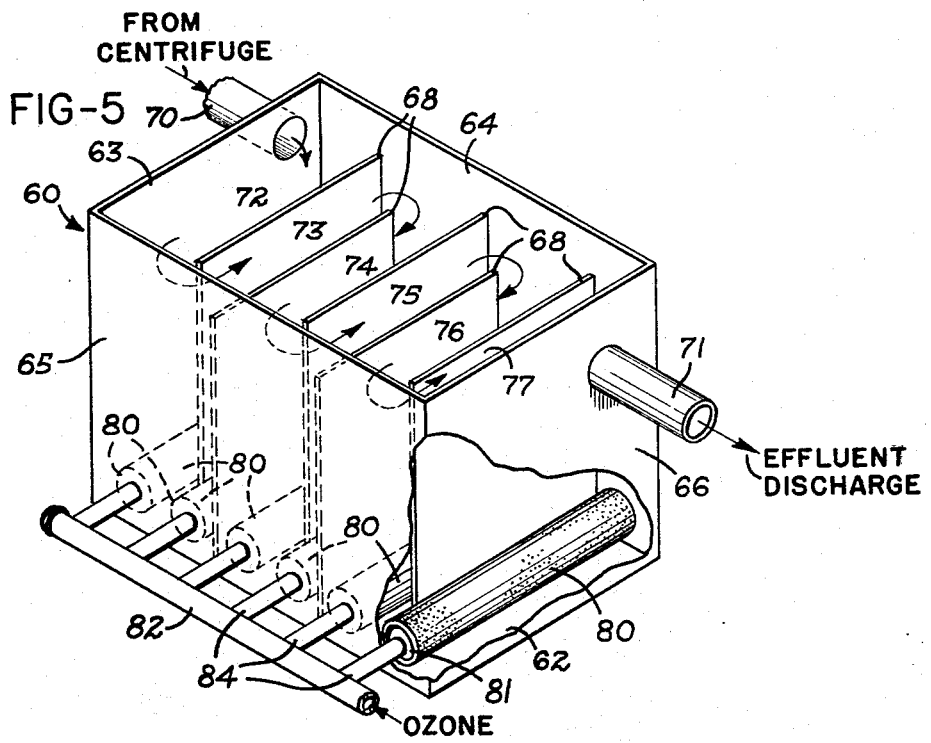

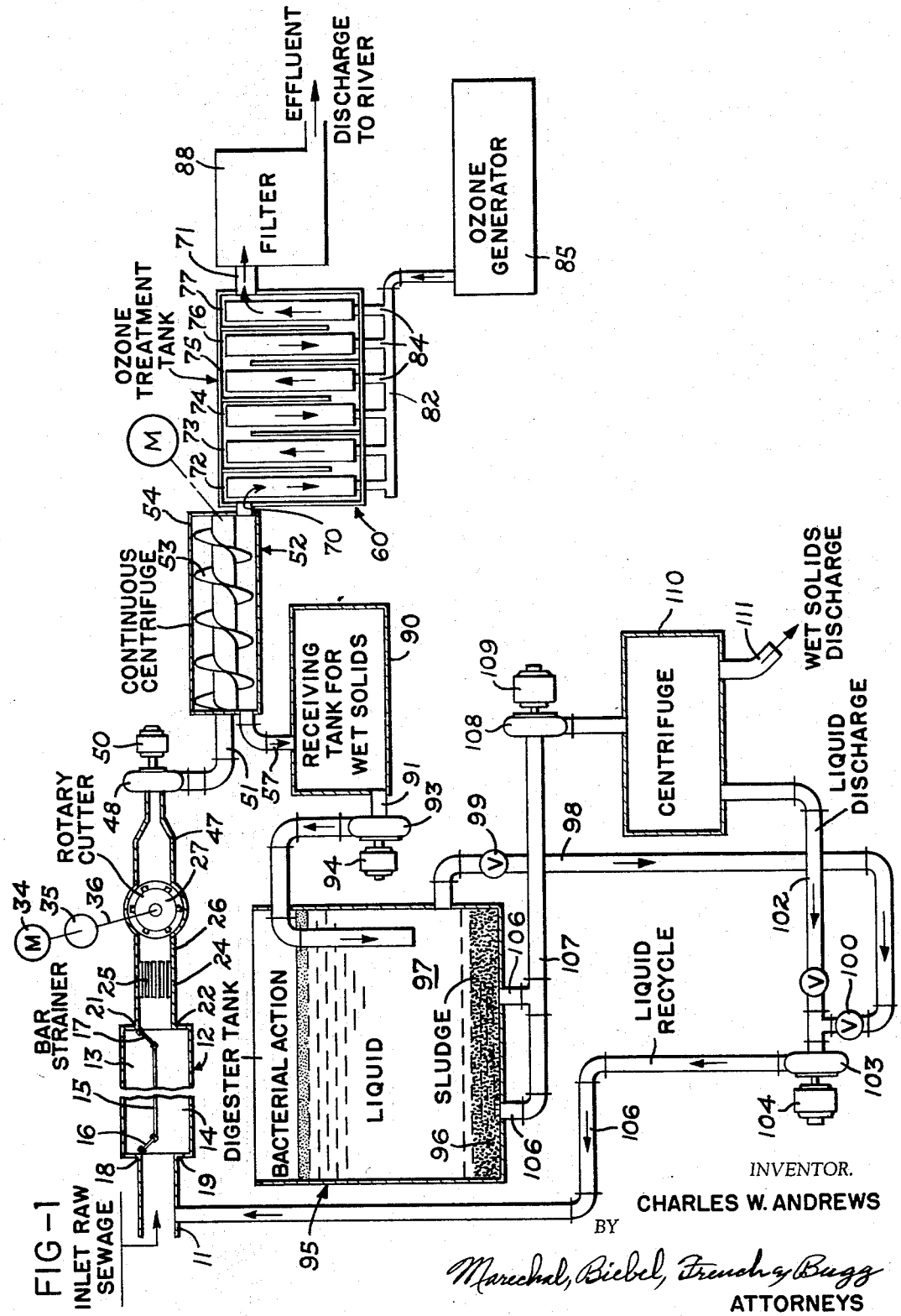

United States Patent Office 3,276,994
Patented Oct. 4, 1966

3,276,994
SEWAGE TREATMENT
Charles W. Andrews, R.R. 2, Greenville, Ohio
Filed Mar. 9, 1966, Ser. No. 532,912
10 Claims. (Cl. 210—8)

This invention relates to treatment of domestic and industrial wastes and particularly to an improved apparatus and process therefor.

Many sewage treatment plants in use today require large area because the primary separation is accomplished in a sedimentation tank of one type or another. In this tank, gravity acts on the sewage to separate the liquid and the suspended solids, and usually a biological action occurs which changes the chemical composition of the sewage. In some instances, the liquid is sprayed through the air in order to reestablish the oxygen level therein. These treatment plates often consume several acres of land, and this is highly objectionable in densely populated areas because of the cost factor as well as aesthetic considerations. Often the space simply is not available, for example, when an industrial plant is required to no longer dump raw sewage into a river but to install a sewage treatment plant.

An important object of this invention is to provide an improved process and apparatus for treating sewage which produces a relatively dry sludge, and relatively pure water which can be disposed of in a stream or river without objectionable consequences.

Anothed object of this invention is to provide an improved sewage treatment apparatus which consumes a substantially reduced area compared to apparatus presently in use, and particularly to provide such apparatus wherein a continuous centrifuge is utilized in the primary separation of solids and liquids rather than a space consuming settling vat.

Another object of this invention is to provide an improved sewage treatment process and apparatus wherein the oxygen content of the liquids is restored through the use of an ozone treatment tank which consumes a relatively small space compared to present aeration systems and which oxidizes impurities and kills the bacteria in the liquids and thus substantially purifies the water.

Other objects and advantages of the invention will be apparent from the following description, the accompanying drawings and the appended claims.

In the drawings:

FIG. 1 is a schematic illustration of the steps in the sewage treatment process;

FIG. 2 is an elevation view partially in section of the rotary cutter utilized in the invention;

FIG. 3 is a sectional view taken along the line 3—3 of FIG. 2;

FIG. 4 is a schematic elevation view showing the operation of the centrifuge; and FIG. 5 is a perspective view, partially broken away, of the ozone treatment tank.

Referring to the drawings wherein a preferred embodiment of the invention is shown, FIG. 1 illustrates schematically the several steps in the process and the equipment used to practice this process. The raw sewage inlet pipe 11 flows into an elongated settling vat 12 which is divided into two separate sections 13 and 14 by the central partition 15. The baffles 16 and 17 are pivotally mounted on the opposite ends of this baffle and can be swung between contact with the corners 18 and 19 or the corners 21 and 22 of the vat 12 to provide two separate paths through the vat. While one section 13 or 14 of the vat 12 is being used and heavy objects such as metals, rubbers, plastic and the like are settling to the bottom thereof, the unused section is being cleaned of such materials.

From the settling vat 12, the sewage passes through the pipe 24 which preferably has a square cross-section into the bar strainer 25 which removes large light-weight objects, such as pieces of clothing and the like, which are floating or suspended in the sewage. The strainer 25 consists of a series of vertical parallel bars which are spaced apart about one to two inches, although it is within the scope of the invention to use other types of strainers for this preliminary coarse screening operation.

From the bar strainer 25, the sewage then passes through the pipe 26 into a rotary cutter 27 which reduces the size of any solids or semi-solids in the sewage to a preset size, preferably such that no dimension is greater than one-half inch. This rotary cutter 27 is shown in detail in FIG. 2 and includes a housing 28 having the side walls 30 with the top and bottom walls 31 and 32 secured therethrough. The motor 34 is mounted above the cutter and drives the gear reduction unit 35 and the output shaft 36 which is journaled through the top and bottom walls 31 and 32 of the housing by the bearings 37 and 38. As shown in FIG. 3, the side walls 30 have projections 40 extending inwardly therefrom and vertically spaced apart a preset distance. The drive shaft 36 has a plurality of disk shaped cutter 42 thereon which have the radially outward extending lugs 43 on the outer periphery thereof for cooperation with the projections 40 on the walls 30.

The cutters 42 are spaced apart a distance equal to the vertical spacing between the projections 40 so that these cutters are aligned with the spaces between the projections 40, as shown in FIG. 2. The spaces 44 are used to position properly the cutters on the shaft 36, and the space between the cutters 42 is open so that particles having a size smaller than these spaces will pass readily therethrough. Particles having a size larger than the spaces 44 are forced by the lugs 43 against the projections 40 and are thereby cut to a smaller size.

From the rotary cutter 27, the sewage then passes through the pipe 47 to the pump 48 which is driven by the motor 50 and which increases the pressure of the sewage and forces it through the pipe 51 and then into the continuous centrifuge 52 which is shown in detail in FIG. 4. In this centrifuge, both the screw 53 and the outer housing 54 are being rotated in the same direction although at different speeds. The sewage is forced under pressure into the interior of the housing 54 wherein centrifugal force imparts a radial direction therethrough to throw the same against the outer wall 55 of the housing 54. The heavier solid materials are held against the wall 55 and the rotating screw 53 causes them to move toward the left-hand end thereof due to the relative rotation between the screw 53 and the housing 54 wherein they are forced in a wet solids form into the conduit 57. The liquids readily flow around the screw 53 and eventually pass from the housing 54 through the conduit 58 in the right-hand end 59 thereof, as shown in FIG. 4. Thus the liquids flowing into the conduit 51 are substantially free of solids as a result of the action in this continuous centrifuge 52.

The liquids then pass into an ozone treatment tank 60, shown in detail in FIG. 5, having a bottom wall 62 and the four side walls 63, 64, 65 and 66. A plurality of baffles 68 extend inwardly alternately from the side walls 64 and 65 to provide a circuitous path between the inlet 70 to the outlet 71. Thus the liquid flowing into the tank 60 must pass sequentially through the spaces 72, 73, 74, 75, 76 and 77 formed between the baffles before reaching the outlet 71. A plurality of porous tiles 80 are disposed in the bottom of the tank adjacent the bottom wall 62 thereof. One of the tiles 80 is located in each of the spaces 72–77 and each has a very large number of tiny openings therein. One end 81 of these tiles has a fluid tight connection to the manifold pipe 82 through the short pipe sections 84 and this manifold pipe is connected to an ozone generator 85 so that ozone can be supplied to each of the spaces 72–77 through the porous tiles 80.

As the liquid sewage passes through the various spaces 72–77 it is subjected to the ozone which is bubbling up therethrough causing oxidation of the organic and chemical materials within the liquid sewage. The resultant oxidation eliminates odor and kills the bacteria as well as improves the color of the water so that it is not objectionable and can be added to a stream or river. In addition, the ozone is highly soluble in water and increases oxygen in the stream or river and thus provides additional natural purification so that the liquid is reoxidized. The outlet 71 from the ozone treatment tank 60 is connected to a filter 88 which removes any tiny particles which remain suspended therein, and then the liquid discharged to a stream or river.

The wet solids which leave the centrifuge 52 through the pipe 57 flow into the collection tank 90 which merely evens out the rate of flow for subsequent steps. The discharge conduit 91 from the collection tank 90 has a pump 93 therein which is driven by the motor 94 to force the wet solids into a digester tank 95 wherein they are allowed to settle for a period of time. In this tank, the heavier solids collect at the bottom surface 96 thereof as sludge and a biological action takes place which chemically changes the composition of some of the sewage. The liquid which collects in the central portion 97 of the tank 95 is removed therefrom through the conduit 98 having the valves 99 and 100 therein. This conduit is connected to a recycling conduit 102 through the pump 103 which is driven by the motor 104 and the conduit 106 which returns the liquids to the inlet 11 of the settling vat 12 so that it can be recycled and eventually discharged through the ozone treatment tank 60.

The sludge from the digester tank 95 is removed from the bottom thereof through a plurality of short pipe sections 106 into the elongated conduit 107 having the pump 108 driven by the motor 109 for increasing the flow rate of the wet solids. These wet solids are then injected into a centrifuge 110 which further separates the liquids from the solids. The centrifuge 110 collects the solids against the exterior wall from where they are removed through the outlet 111 during an automatic reversing operation where solids are scraped from the walls thereof. The liquids from this centrifuge 110 flow through the recycling conduit 102 and the valve 112 to the pump 103 which forces these liquids back to the inlet 11 of the settling vat 12.

To summarize the operation of the process and apparatus, the raw sewage is conducted into the settling vat 12 wherein the heavy particles settle to the bottom and are subsequently removed. The sewage then passes through a bar strainer 25 which removes large light-weight materials which are suspended in the sewage. From this filter, the sewage passes into the cutter 28 which reduces the size of any particles, and then this sewage flows into the centrifuge 52 which effectively removes a large portion of the liquid from the solids. This liquid is then treated in the ozone tank 60 which substantially purifies the liquid and restores the oxygen content thereof so that it can be returned to a stream or river without any undesirable contamination. The wet solids are further treated in the digester tank 95 to remove an additional quantity of liquid therefrom which is recycled through the pipe 98 and the pump 103 to the inlet 11 of the treatment apparatus. The wet sludge is removed from the bottom of the digester tank 95 and placed in another centrifuge 110 which further separates liquid therefrom and then this sludge is disposed of in the usual manner. The liquid from the centrifuge 110 is then also recycled through the pipes 102 and 106.

Accordingly, the invention has provided an improved sewage treatment process and apparatus which separate sludge and purify the liquids while consuming only a very minimum space compared to that required to systems which use large sedimentation tanks for separation and restoration of the oxygen level. The sewage is continually separated into liquids and solids so that the sludge produced is relatively free of liquid.

It should be understood that the process as described can be modified without departing from the scope of the invention. For example, the ozone treatment tank can be utilized in other and presently existing systems, and other means for restoring the oxygen level and purifying liquid can be substituted therefor. Likewise, the digester tank 95 and second centrifuge 110 may be replaced with other expedients for further separating the sludge from the liquids.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. The process of treating raw sewage to reduce it to wet solids and a substantially bacteria free liquid comprising, the steps of permitting the raw sewage to settle for a preset time to allow metal and other heavy material to settle to the bottom of a settling tank for subsequent removal, then passing the sewage through a strainer device to remove large light-weight objects, then passing the sewage through a rotary cutter to reduce the size of solids in said sewage to about one-half inch or less, then conducting the sewage to a high speed centrifuge to separate the sewage into a liquid and a semi-solid, then subjecting said liquid to treatment by ozone gas to eliminate substantially the bacteria therein and to purify said liquid, allowing said semi-solid to settle in a second settling tank too further separate liquid from said semi-solid, subjecting the solid from said second settling tank to a second centrifuge to further separate liquid and solid, then removing said solids from said second centrifuge and recycling the liquids from said second settling tank and said second centrifuge through the entire process.

2. The process of treating raw sewage to reduce it to wet sludge and a substantially pure liquid comprising, the steps of passing the sewage through a rotary cutter to reduce the size of solids in said sewage to a preset maximum size, then conducting the sewage to first centrifugal separation apparatus to separate the sewage into a liquid and wet solids, then bubbling ozone through said liquid to eliminate substantially the bacteria therein and reestablish the oxygen level in said liquid, allowing said wet solids to settle to further separate liquid from said wet solids, then passing the wet solids into second centrifugal separation apparatus to further separate liquid and solids, and recycling the liquid from said second centrifugal separation apparatus through the entire process.

3. A process as defined in claim 2 wherein said first centrifugal separation step is continuous.

4. A process as defined in claim 2 wherein said liquid from said first centrifugal separation step flows through a plurality of connected chambers wherein ozone is being emitted adjacent the bottom thereof so that it bubbles upward through said liquid to create a clear, colorless, odorless effluent having a high amount of dissolved oxygen therein.

5. Apparatus for treating raw sewage to reduce it to wet sludge and a substantially pure liquid comprising, rotary cutter means to reduce the size of solids in said sewage to a predetermined small size, a centrifuge for receiving said sewage from said rotary cutter separating the sewage into a liquid and wet solids, ozone treatment means for subjecting said liquid to treatment by ozone gas to eliminate substantially the bacteria therein and create a clear and odorless effluent having a high level of dissolved oxygen therein, separation means for further separating said wet solids into wet sludge and liquids, means for removing wet sludge from said separation means, and means for recycling the liquids from said separation means through the entire apparatus.

6. Apparatus as claimed in claim 5 wherein settling vat means are provided upstream of said cutter means for accumulating the raw sewage and permitting it to settle for a preset time to allow metal and other heavy material to settle to the bottom thereof for subsequent removal.

7. Apparatus as claimed in claim 6 wherein said separation means includes a settling tank for receiving said wet solids and said centrifuge and allowing said wet solids to settle to further separate liquid from said wet solids.

8. Apparatus as claimed in claim 7 wherein said separation means also includes a second centrifuge for receiving said wet solids from said settling tank to separate said wet solids into liquid and wet sludge.

9. Apparatus as claimed in claim 5 wherein said ozone treatment means includes a tank having baffles extending alternately from opposite side walls to define a circuitous path through said tank, an inlet at one end of said tank and an outlet at the other end for the flow of said liquid through said tank by way of said circuitous path, and ozone distributing means in each of said paths.

10. Apparatus as claimed in claim 9 wherein said ozone distributing means is a porous tubular member disposed adjacent the bottom of said tank between said baffles, and ozone generating means for supplying ozone to each of said tubular members for flow through the pores therein and upwardly through said liquid.

References Cited by the Examiner
UNITED STATES PATENTS

| | | | |
|---|---|---|---|
| 1,915,240 | 6/1933 | Putnam | 210—28 |
| 2,058,026 | 10/1936 | McCallum | 233—47 X |
| 2,151,079 | 3/1939 | Bowen | 210—60 X |

MORRIS O. WOLK, *Primary Examiner.*

M. E. ROGERS, *Assistant Examiner.*